United States Patent
Knoppert (10) Patent No.: US 11,435,778 B2
(45) Date of Patent: Sep. 6, 2022

(54) HIDDEN MONITOR SUPPORT

(71) Applicant: Dell Products L.P., Round Rock, TX (US)

(72) Inventor: Michiel Sebastiaan Emanuel Petrus Knoppert, Amsterdam (NL)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/143,839

(22) Filed: Jan. 7, 2021

(65) Prior Publication Data
US 2022/0214715 A1 Jul. 7, 2022

(51) Int. Cl.
G06F 1/16 (2006.01)
F16M 11/22 (2006.01)
F16M 13/02 (2006.01)
H04R 5/02 (2006.01)

(52) U.S. Cl.
CPC ........... *G06F 1/1605* (2013.01); *F16M 11/22* (2013.01); *F16M 13/02* (2013.01); *F16M 2200/027* (2013.01); *G06F 1/1607* (2013.01); *H04R 5/02* (2013.01)

(58) Field of Classification Search
USPC ..... 248/121, 122.1, 123.11, 123.2, 127, 146, 248/154, 917, 918; 361/679.21, 679.22
See application file for complete search history.

(56) References Cited

U.S. PATENT DOCUMENTS

| 7,121,516 | B1* | 10/2006 | Koh | A47B 17/033 |
| | | | | 248/226.11 |
| 7,195,215 | B2* | 3/2007 | Lin | F16M 11/2014 |
| | | | | 248/125.9 |
| 9,038,971 | B1* | 5/2015 | Guthrie | F16M 11/40 |
| | | | | 248/121 |
| 10,578,242 | B2* | 3/2020 | Hung | F16M 11/20 |
| 2005/0095062 | A1* | 5/2005 | Iverson | F16B 2/10 |
| | | | | 403/374.3 |
| 2007/0139870 | A1* | 6/2007 | Lin | F16M 13/022 |
| | | | | 361/679.22 |
| 2008/0029663 | A1* | 2/2008 | Derry | F16M 11/10 |
| | | | | 248/178.1 |
| 2008/0142659 | A1* | 6/2008 | Sun | F16M 11/24 |
| | | | | 248/226.11 |
| 2010/0132122 | A1* | 6/2010 | Hollingshead | A47C 21/003 |
| | | | | 5/658 |

(Continued)

OTHER PUBLICATIONS

ENERQI, "The linvisible Fast Wireless Charger," downloaded from https://enerqi.co/ on Dec. 1, 2021, 6 pages.

(Continued)

*Primary Examiner* — Alfred J Wujciak
(74) *Attorney, Agent, or Firm* — Zagorin Cave LLP; Robert W. Holland (57) ABSTRACT

A display stand holds a monitor over a desktop surface in a robust manner by having a bottom support extend under the desktop surface and couple with a clamp that holds a support arm up and over the desktop upper surface with a minimal footprint at the desktop upper surface. In one embodiment, a functional unit is included with the bottom support to provide a function from under the desktop at the upper desktop surface, such as a wireless charger, a capacitive touch writing pad and/or a speaker.

11 Claims, 5 Drawing Sheets

(56) References Cited

U.S. PATENT DOCUMENTS

| | | | |
|---|---|---|---|
| 2011/0255850 A1* | 10/2011 | Dinh | H01L 23/552 |
| | | | 396/176 |
| 2012/0119040 A1* | 5/2012 | Ergun | A47B 21/02 |
| | | | 248/126 |
| 2019/0082824 A1* | 3/2019 | Matlin | A47B 21/02 |
| 2019/0293228 A1* | 9/2019 | Hung | F16M 13/02 |
| 2019/0295446 A1* | 9/2019 | Hung | F16M 13/02 |
| 2020/0133368 A1* | 4/2020 | Volek | G06F 1/266 |
| 2020/0191321 A1* | 6/2020 | Kleist | F16M 11/14 |

OTHER PUBLICATIONS

Humanscale, "Monitor Arms & Integrated Docks," downloaded from https://www.humanscale.com/products/monitor-arms on Dec. 1, 2021, 4 pages.

* cited by examiner

HIDDEN MONITOR SUPPORT

BACKGROUND OF THE INVENTION

Field of the Invention

The present invention relates in general to the field of information handling system display monitors, and more particularly to an information handling system hidden monitor support.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically process information with a goal of outputting the information as visual images at a display monitor. A monitor generally has a flat or curved panel of pixels that generate visual images defined by pixel values provided from an information handling system, such as through a display cable. For example, each pixel is scanned a pixel value that defines a color for presentation so that a composite image is defined by pixels as a whole. Pixels may generate colors by filtering a white backlight that passes through the pixel, such as with red, green and blue liquid crystal materials, or by generating illumination of red, green and blue colors, such as with an organic light emitting diode material. Generally, in order to minimize the space consumed by a monitor on a desktop surface, the display panel is designed to have a minimal thickness and a minimal bezel on the display panel outer perimeter. Further, to help an end user arrange the display at the desktop, the display panel is designed to have a minimal weight. Typically, end user's prefer to maximize a monitor's display panel surface while minimizing the amount of space consumed by the monitor at the desktop surface. Generally, end users have other uses for desktop surface space, such as placement of an information handling system, placement of peripherals other than the display and room to write and draw.

Often, monitors hold a display panel elevated over a desktop surface with a stand that rest on the desktop surface and couples to a housing of the monitor that holds the display panel. One difficulty with using a stand that rests on a desktop is that larger monitors have an awkward weight distribution that can call for a relatively large stand footprint on the desktop surface. The stand structure can interfere with placement of the display relative to walls and can interfere with the usage of the desktop surface in the area in front of the monitor. To avoid the use of a desktop surface stand, another option is to couple the monitor to an articulating arm that holds the monitor above the desktop surface. For example, the articulating arm may couple to a wall so that the monitor hangs over top of the desktop surface without consuming any space on the desktop surface itself. A disadvantage of wall mounts is that a bracket generally must couple to a supporting portion of the wall, which typically involves screws that have some permanence and involves using tools for assembly of the bracket. As an alternative, some articulating arms clamp to the desktop surface with a screw arrangement disposed under the desktop. For example, a plate rests over the desktop surface with nut held under the desktop surface so that a bolt passed from the plate and through the nut compresses the plate against the desktop surface to steady the monitor. Although a clamp attachment offers secure support of the monitor, the plate on the desktop surface interferes with end user desktop usage. In addition, clamp arrangements can prove difficult to assemble and interact with.

SUMMARY OF THE INVENTION

Therefore, a need has arisen for a system and method which provides a hidden monitor support.

In accordance with the present invention, a system and method are provided which substantially reduce the disadvantages and problems associated with previous methods and systems for supporting a monitor over a desktop surface. A bottom support is coupled against a desktop lower surface with a clamp that extends above the desktop upper surface to fit into an opening of a support arm that holds the monitor.

More specifically, a display panel that presents information as visual images as a monitor is held in a raised position over a desktop surface by a stand coupled to the desktop. The stand includes a bottom support that extends under the desktop and couples against the desktop bottom surface with a clamp. The clamp has a lower portion coupled at the lower surface of the desktop and to the bottom support, and an upper portion coupled at the upper side of the desktop. A coupling device, such as a bolt, passes through the clamp upper portion to engage threads of the clamp lower portion and engage the clamp with the desktop having the bottom support pressed up and against the desktop bottom surface and the clamp upper portion extending upward. A support arm having an opening at the bottom fits the opening over the clamp upper portion and the coupling device to provide a robust monitor support with minimal footprint and the bottom support hidden under the desktop. A lever rotationally couples to the clamp upper portion and by an over center member to the clamp lower portion to lock the clamp to the desktop with an over center rotation. An opening in the side of the support arm allows access to the lever when the support arm fits over the clamp upper portion and lever. The hidden bottom support can include functional modules that interact with an end user through the desktop surface, such as a wireless charger, a capacitive touch surface and a speaker.

The present invention provides a number of important technical advantages. One example of an important technical advantage is that an information handling system hidden monitor support provides robust support to hold a display monitor over a desktop surface with minimal footprint at the desktop surface. The hidden support extends under the desktop out of sight of an end user and with a sufficient surface area to provide strong support of the support arm. The clamp securely couples the bottom support to the desktop lower surface with a bolt that is hidden when the support arm bottom opening fits over the clamp upper portion. An over center lock accessible with a lever that extends out a side opening of the support arm provides a readily available lock and release of the clamp. The relatively large surface area of the bottom support offers a structure that provides functions at the desktop without consuming desktop space, such as wireless charging,

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A hidden monitor stand supports a display panel over a desktop for presentation of visual images generated by an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
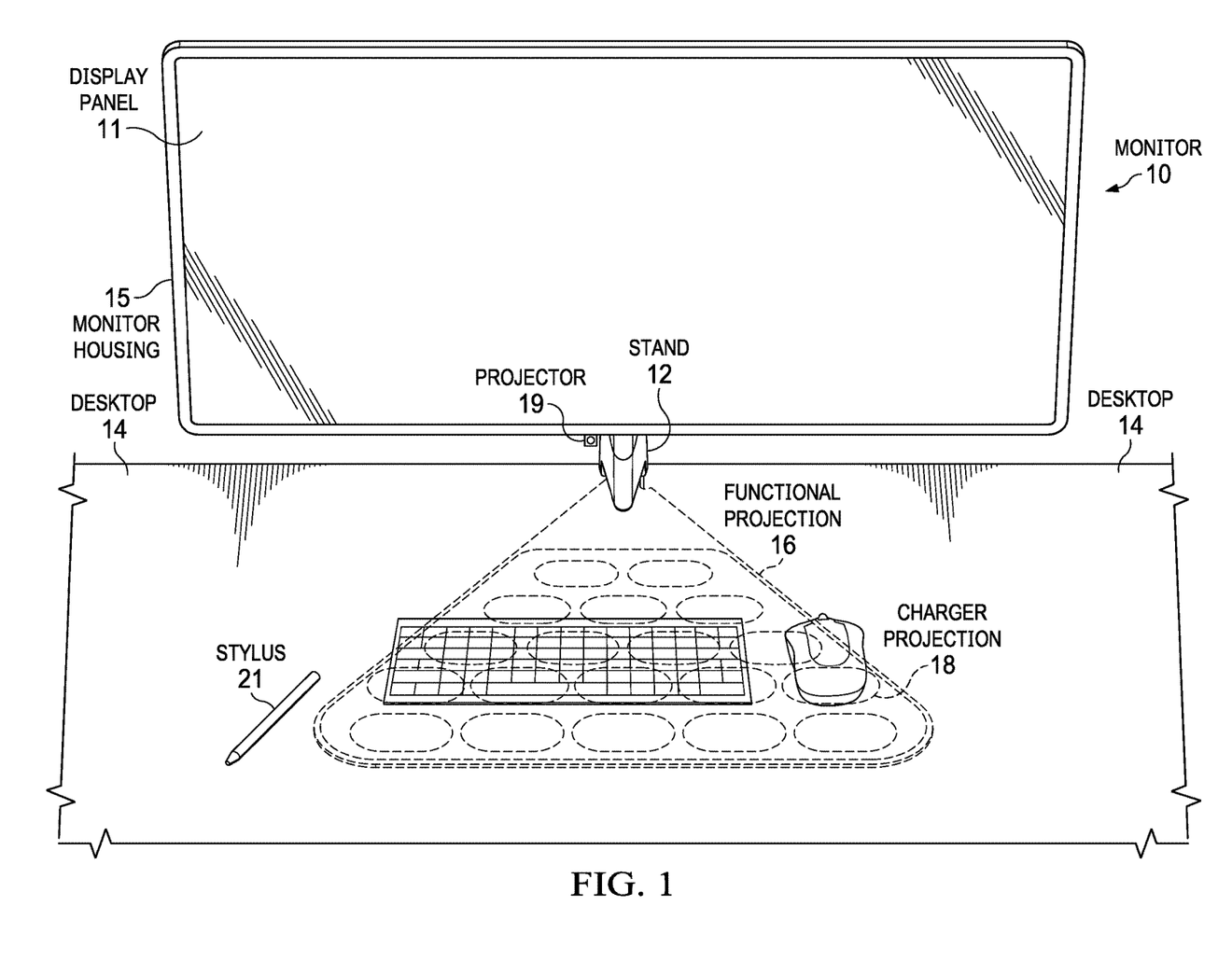
FIG. 1 depicts a front perspective view of a monitor and stand having a bottom support disposed under a desktop surface.

Referring now to FIG. 1, a front perspective view of a monitor 10 and stand 12 depicts a bottom support disposed under a desktop 14 surface. Monitor 10 presents visual images provided by an information handling system at a display panel 11 coupled in a monitor housing 15, such as a liquid crystal display (LCD) panel or an organic light emitting diode (OLED) display panel. The example embodiment illustrates a position of a bottom support disposed under desktop 14 with a functional projection 16 that is presented by a projector 19 included in monitor housing 15. The primary purpose of the bottom support is to obtain a robust stand 12 by placing a wide flat surface against the bottom of desktop 14 to hold stand 12 still. A secondary purpose of the bottom support is to include functional modules that supplement information handling system interactions at the surface of desktop 14 without consuming desktop space. In the example embodiment, functional projection 16 defines a perimeter of the bottom support and includes a charger projection 18 that shows an end user a location of a wireless charger included in the bottom support so that an end user can place devices, such as smartphones, that can charge wirelessly on desktop 14. As another example, functional projection 16 defines a perimeter of a capacitive touch sensor included in the bottom support that detects touches of an active stylus 21 to support end user written inputs at desktop 14. Other functions that can be included are a speakers, such as a bass subwoofer that projects sound through desktop 14, a microcompute space that defines a projected keyboard and touchpad over a capacitive sensor, and interactive help for using display panel 11.

Figure 2:
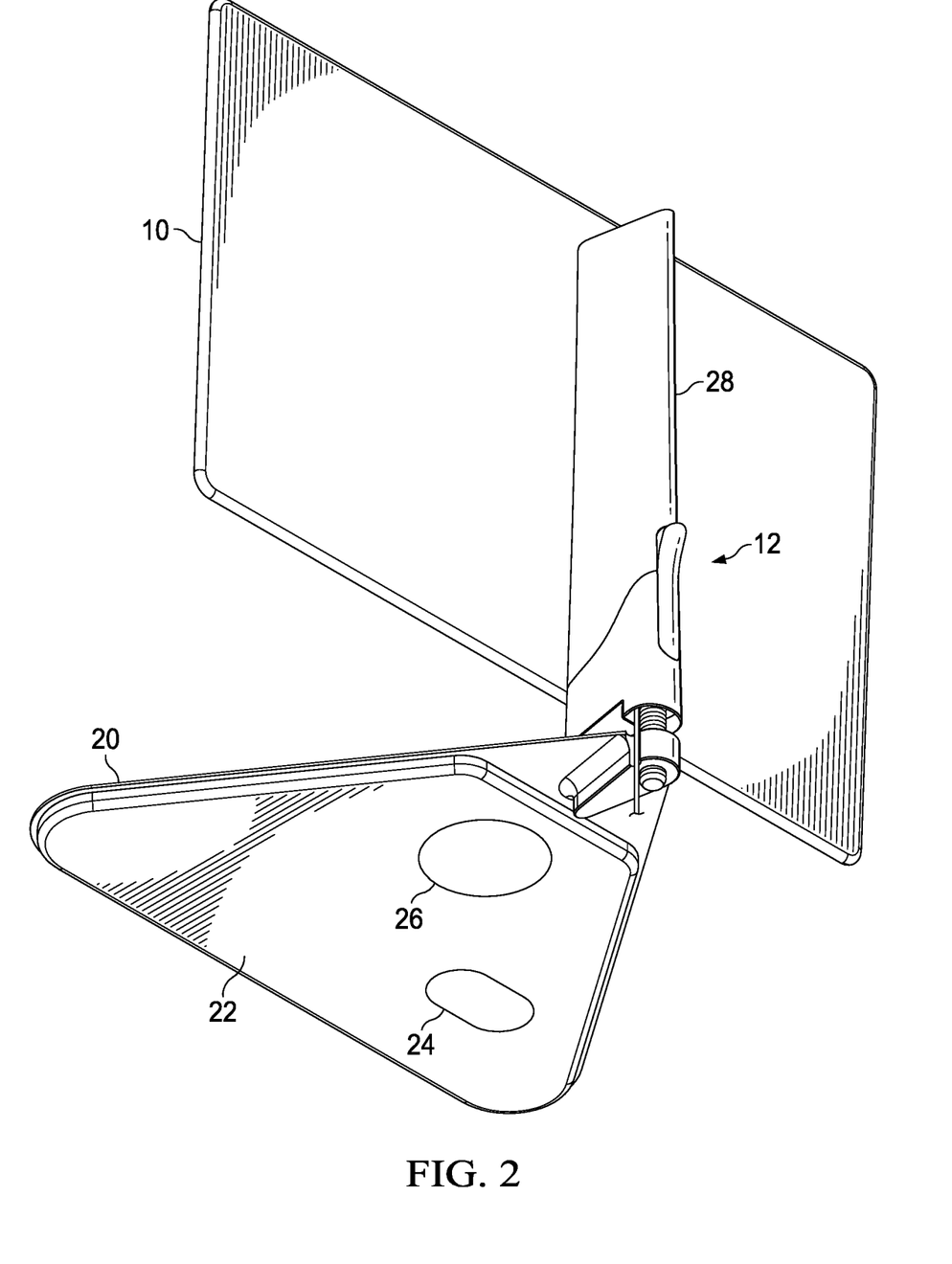
FIG. 2 depicts a bottom rear perspective view of the monitor stand separate from the desktop.

Referring now to FIG. 2, a bottom rear perspective view depicts the monitor 10 stand 12 separate from the desktop. Bottom support 20 extends under the desktop surface and is pressed against the lower surface of the desktop to provide a firm anchor for stand 12 raised above the desktop surface. A functional module 22 couples to bottom support 20 to provide integrated functions for monitor 10. In the example embodiment, the integrated functions include a charger coil 24 to provide wireless charging above the desktop surface and a speaker 26 to provide audible sounds. These additional functions provided to an end user above the desktop surface by the hidden monitor bottom support 20 will appear magical as the functions are provided without consuming desktop space above the desktop surface.

Figure 3:
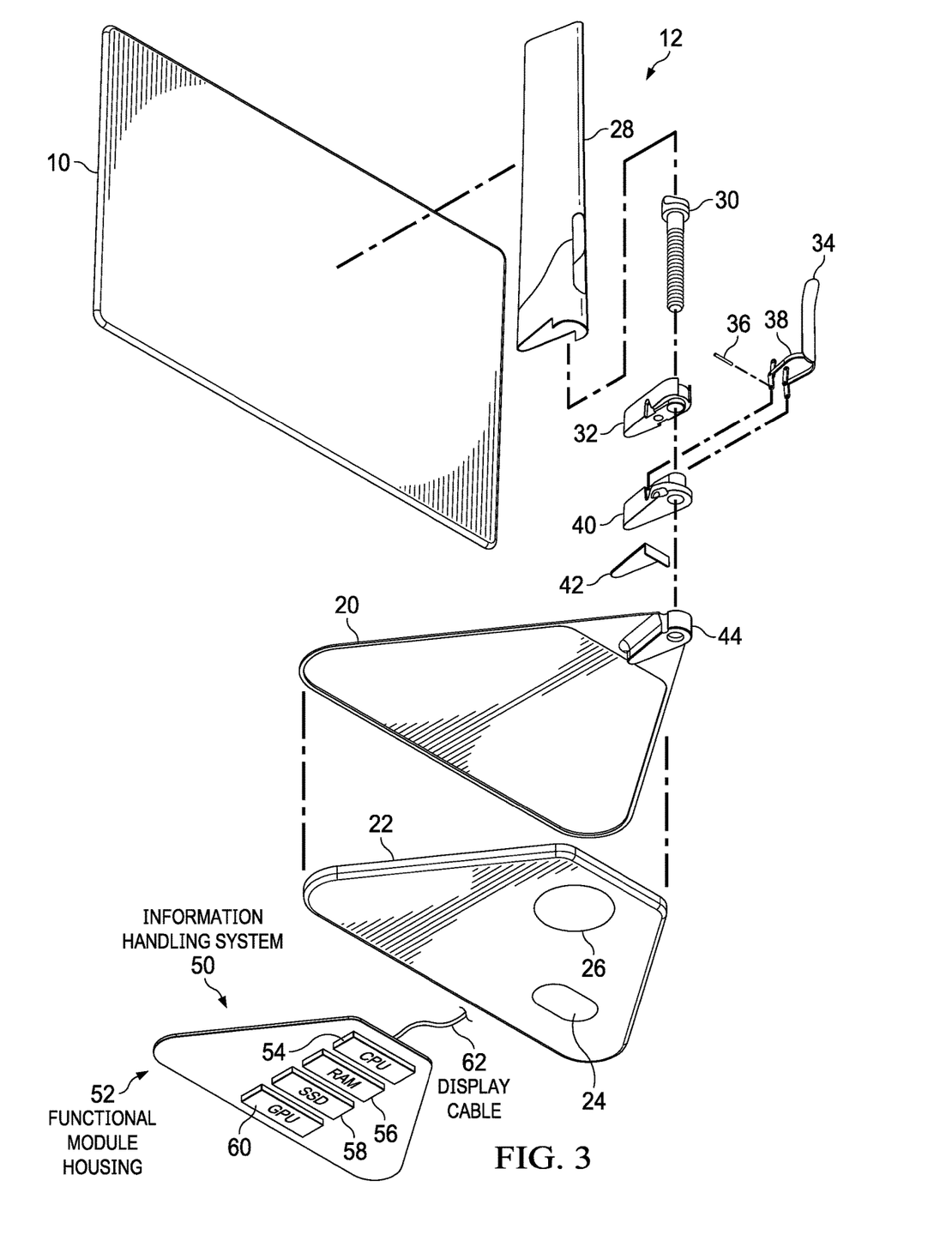
FIG. 3 depicts a bottom rear exploded perspective view of the monitor stand separate from the desktop.

Referring now to FIG. 3, a bottom rear exploded perspective view depicts the monitor 10 stand 12 separate from the desktop. Stand 12 has a support arm 28 that extends upward above the desktop to support monitor 10, such as with a VESA standard display bracket. In the example embodiment, support arm 28 is stationary vertical member, however, in alternative embodiments a swing arm or multi-monitor support may be used. Support arm 28 is held vertical by a clamp arrangement coupled to bottom support 20. In the example embodiment, bottom support 20 couples to functional module 22 as separate entities, however, in alternative embodiments the functional modules, such as charger coil 24 and speaker 26, may be integrated with bottom support 20. In one example embodiment, a functional module 22 can include a micro-compute device that processes information for presentation as visual images at monitor 10. For instance, a function module housing 52 holds a central processing unit (CPU) 54 that executes instructions to process information in cooperation with a random access memory (RAM) 56, such as an operating system and applications stored in persistent memory of a solid state drive (SSD) 58. A graphics processing unit (GPU) 60 further processes the information to generate pixel values for communication through a display cable 62 to monitor 10 for presentation. The example embodiment depicts functional module housing 52 as a separate element that couples to bottom support 20, however, the information handling system 10 and functional module housing 52 may integrate with bottom support 20 as a contiguous unit. In addition, charging coil 24 and speaker 26 may be included in functional module housing 52 with the processing components.

The clamp arrangement that hold support arm 28 in a raised position coupled to bottom support 20 includes a clamp upper portion 32 that assembles above a desktop and a clamp lower portion 44 coupled to bottom support 20 and assembled below the desktop. A bolt 30 inserts through an opening of clamp upper portion 32 to engage threads formed in clamp lower portion 44 so that the clamp assembly captures the desktop between the upper and lower portions to force bottom support 20 against the desktop lower surface. An edge piece 42 fits under clamp upper portion 32 to ensure separation of bolt 30 from the side of the desktop. A lever 34 interposes between the clamp upper and lower portions to allow a convenient adjustment of the location of the monitor at the desktop. In the example embodiment, lever 34 rotationally couples to clamp upper portion 32 with a pin 36 that passes through an over center member 38. To provide ease of assembly, clamp upper portion 32 is assembled with a base piece 40 that couples around lever 34 and provides an over center lock function. Over center member 38 couples between the clamp upper and lower portions to move the upper and lower portions relative to each other based upon a position of lever 34. In the example embodiment, lever 34 provides a fine adjustment with a relatively small movement so that the clamp assembly can slide relative to the desktop when lever 34 is loose and locks in place when lever 34 is tight. In an alternative embodiment, lever 34 can provide a larger relative movement to assemble the clamp upper and lower portions without relying upon a bolt 30. As is described in greater detail below, full rotation of lever 34 into support member 28 provides an over center rotation that locks lever 34 in place.

Figure 4A:
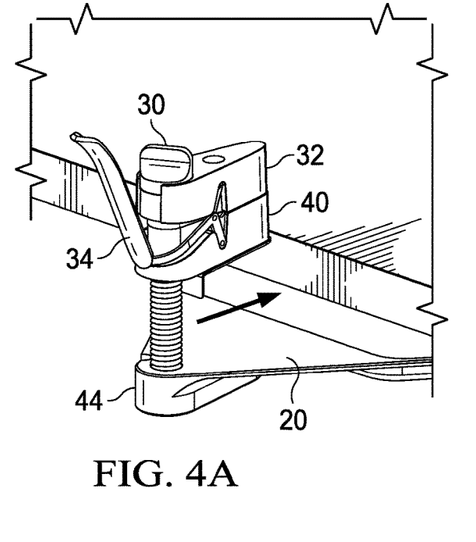
FIGS. 4A, 4B, 4C, 4D, 4E and 4F depict coupling of the monitor stand to a desktop.
Figure 4B:
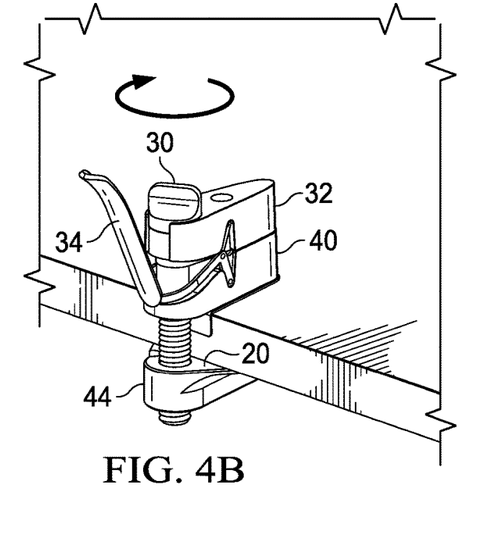

Referring now to FIGS. 4A, 4B, 4C, 4D, 4E and 4F the coupling of the monitor stand to a desktop is depicted. FIG. 4A depicts coupling of the clamp assembly to the desktop with lever 34 is a loose position. Bolt 30 passes through clamp upper portion 32 to engage with threads of clamp lower portion 44 and bring bottom support 20 against the bottom side of the desktop. Clamp upper portion 32 captures lever 34 within a base piece 40 to provide vertically-spaced rotational pivot locations for compressing the clamp upper and lower portions and for providing an over center lock function. As is depicted by FIG. 4B, with lever 34 extended away from clamp upper portion 32, the clamp assembly is in a loose and unlocked position so that bolt 30 can set a rough spacing of the clamp at the desktop without fully tightening into place.

Figure 4C:
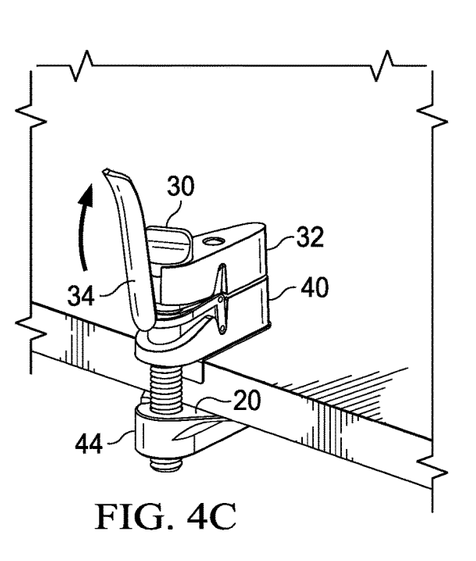
Figure 4D:
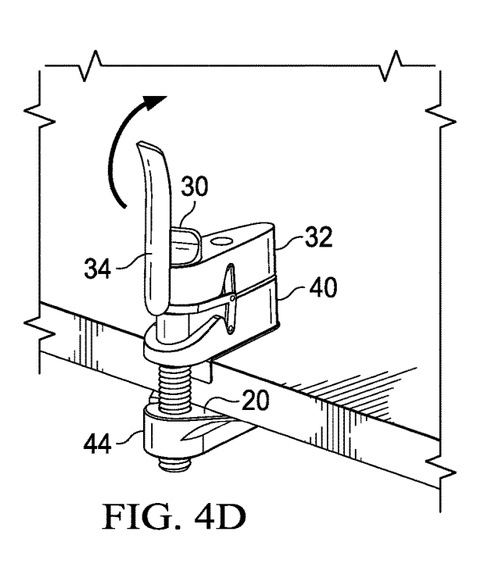
Figure 4E:
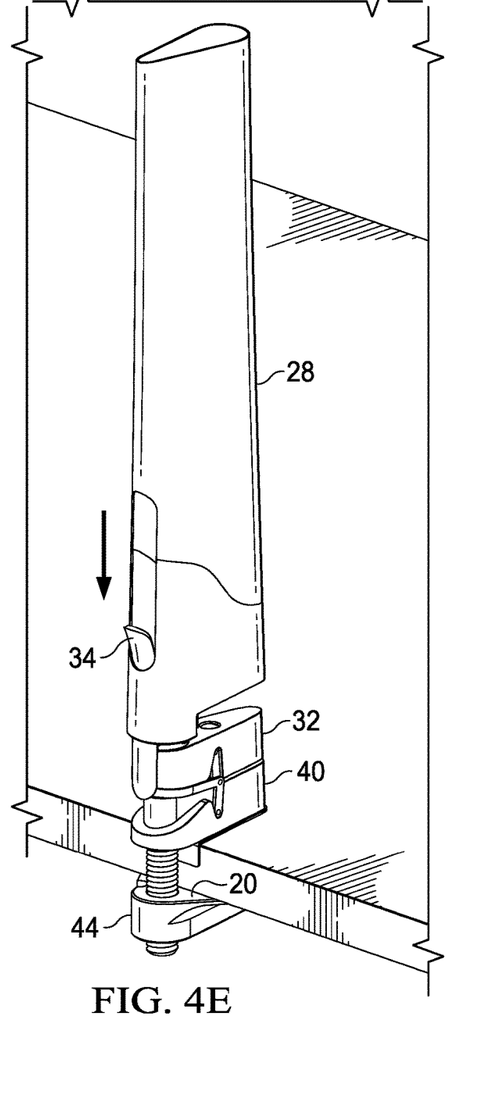
Figure 4F:
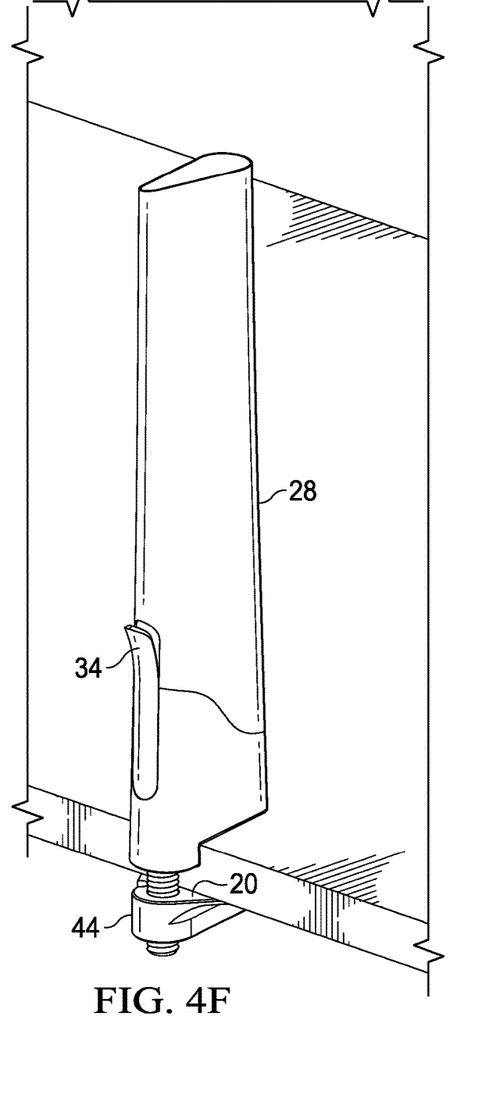

Once stand 12 is held in place with tightening of bolt 30, at FIG. 4C lever 34 is raised to a center position that compresses the clamp upper and lower portions to provide a firm placement of bottom support 20 against the desktop bottom surface, which anchors in place clamp upper portion 32. Further over center rotation as shown by FIG. 4D then locks lever 34 in the raised position by working the clamping force against rotation to the loose position. Once lever 34 is raised over center, clamp upper portion 32 provides a firm base held in place by bottom support 20 to hold monitor 10 in the raised position. In addition, clamp upper portion 32 consumes a minimal footprint at the upper surface of the desktop. FIG. 4E depicts coupling of support arm 28 over clamp upper portion 32 to hold the monitor in the raised position. An opening in the base of support arm 28 fits over top of lever 34 and clamp upper portion 32 to slide to the desktop surface, thus covering bolt 30 and the over center lock linkage and rotation points. An opening in the side of support arm 28 provides access to lever 34 once support arm 28 is fully pressed down into place, as is illustrated by FIG. 4F.

Although the present invention has been described in detail, it should be understood that various changes, substitutions and alterations can be made hereto without departing from the spirit and scope of the invention as defined by the appended claims.

What is claimed is:

1. A monitor comprising:
   a display panel operable to present information as visual images;
   a support arm coupled to a rear of the display panel and having a base, the base defining an opening;
   a bottom support configured to fit under a desktop;
   a clamp having a lower portion, an upper portion, and a coupling device, the lower portion capturing the bottom support against the desktop lower surface, the upper portion disposed at the desktop upper surface, the coupling device compressing the lower and upper portions about the desktop, the upper portion extending up from the desktop and sized to fit in the opening; and
   a functional module coupled to the bottom support, the functional module operable to provide a function through the desktop and at the desktop upper surface;
   wherein the functional module comprises a wireless charging element operable to wirelessly charge a device resting on the desktop upper surface.

2. The monitor of claim 1 wherein the functional module comprises a speaker generating a bass sound to transmit through the desktop.

3. A monitor comprising:
   a display panel operable to present information as visual images;
   a support arm coupled to a rear of the display panel and having a base, the base defining an opening;
   a bottom support configured to fit under a desktop;
   a clamp having a lower portion, an upper portion, and a coupling device, the lower portion capturing the bottom support against the desktop lower surface, the upper portion disposed at the desktop upper surface, the coupling device compressing the lower and upper portions about the desktop, the upper portion extending up from the desktop and sized to fit in the opening;
   a capacitive touch sensor coupled to the bottom support; and
   an active stylus operable to perform touch inputs at the capacitive touch sensor at the desktop upper surface.

4. A method for supporting a monitor over a desktop, the method comprising:
   coupling a bottom support to a desktop bottom surface with a clamp having a lower portion and an upper portion, the upper portion extending above the desktop;
   inserting a support arm opening over the upper portion to couple the support arm over the desktop; and
   coupling a monitor to the support arm over the desktop;
   wherein the coupling a bottom surface further comprises:
   compressing the clamp upper and lower portions by a lever rotationally coupled to the clamp;
   inserting the lever into the support arm opening when inserting the support are opening over the upper portion.

5. The method of claim 4 wherein the coupling a bottom surface further comprises:
   inserting a bolt through the clamp upper portion to engage threads in the clamp lower portion; and
   inserting the support arm opening over the bolt when inserting the support arm opening over the upper portion.

6. The method of claim 4 further comprising:
   coupling the lever to the clamp upper and lower portions with an over center member; and rotating the lever to an over center position to lock the clamp to the desktop.

7. A method for supporting a monitor over a desktop, the method comprising:
coupling a bottom support to a desktop bottom surface with a clamp having a lower portion and an upper portion, the upper portion extending above the desktop;
inserting a support arm opening over the upper portion to couple the support arm over the desktop; and
coupling a monitor to the support arm over the desktop;
integrating a wireless charger with the bottom support; and
wirelessly charging a device through the desktop with the wireless charger.

8. The method of claim 7 further comprising projecting an image from the monitor to the desktop of a location of the wireless charger.

9. A method for supporting a monitor over a desktop, the method comprising:
coupling a bottom support to a desktop bottom surface with a clamp having a lower portion and an upper portion, the upper portion extending above the desktop;
inserting a support arm opening over the upper portion to couple the support arm over the desktop; and
coupling a monitor to the support arm over the desktop;
integrating a capacitive touch sensor with the bottom support; and
accepting touch inputs at the capacitive touch sensor through the desktop.

10. A display stand comprising:
a bottom support configured to fit under a desktop surface;
a clamp having a lower portion configured to hold the bottom support against the lower desktop surface, an upper portion configured to rest on the desktop upper surface, and a coupling device to couple the upper and lower portions;
a support arm having an opening at a bottom side, the opening sized to fit around the clamp upper portion and over the coupling device;
a lever rotationally coupled to the clamp upper portion; and
an over center member coupling the lever and the clamp lower portion, the lever compressing the lower and upper portions together and locking the lower and upper portions in the compressed position with an over center rotation.

11. The display of claim 10 further comprising a wireless charger included with the bottom support and operable to wirelessly charge a device placed on the desktop upper surface.

* * * * *